(12) United States Patent
Sugawara et al.

(10) Patent No.: US 7,834,753 B2
(45) Date of Patent: Nov. 16, 2010

(54) DATA CARRIER AND DATA CARRIER SYSTEM

(75) Inventors: Yoshikazu Sugawara, Tokyo (JP); Naotaka Yasuda, Tokyo (JP); Takashi Kubo, Tokyo (JP); Kikuzo Sawada, Tokyo (JP); Yuming Tang, Tokyo (JP)

(73) Assignee: Yoshikawa RF Systems Co., Ltd., Kitakyushu-shi (JP)

( * ) Notice: Subject to any disclaimer, the term of this patent is extended or adjusted under 35 U.S.C. 154(b) by 405 days.

(21) Appl. No.: 11/976,879

(22) Filed: Oct. 29, 2007

(65) Prior Publication Data

US 2008/0100415 A1    May 1, 2008

(30) Foreign Application Priority Data

Oct. 31, 2006   (JP)   ............................. 2006-296512
Sep. 25, 2007   (JP)   ............................. 2007-247642

(51) Int. Cl.
*G08B 26/00* (2006.01)
*G05B 19/00* (2006.01)
(52) U.S. Cl. ..................... 340/505; 340/572.1; 340/5.8; 340/10.1; 340/5.61; 340/825.72; 235/380
(58) Field of Classification Search ................. 340/505, 340/572.1, 5.8, 10.1
See application file for complete search history.

(56) References Cited

U.S. PATENT DOCUMENTS

| | | | |
|---|---|---|---|
| 5,206,495 A | | 4/1993 | Kreft |
| 5,999,713 A | | 12/1999 | Reiner et al. |
| 6,161,762 A | * | 12/2000 | Bashan et al. ................ 235/492 |
| 6,375,082 B1 | * | 4/2002 | Kobayashi et al. ........... 235/492 |
| 6,474,558 B1 | | 11/2002 | Reiner |

(Continued)

FOREIGN PATENT DOCUMENTS

DE   3935364 C1   8/1990

(Continued)

OTHER PUBLICATIONS

Finkenzeller Klaus: "RFID-Handbuch: Grundlagen und praktische Anwendungen induktiver Funkanlagen, Transponder und kontaktloser Chipkarten:8. Datensicherheit," RFID Handbook: Grundlagen Und Praktische Anwendungen, Jan. 2002, pp. 225-231.

(Continued)

*Primary Examiner*—Donnie L Crosland
(74) *Attorney, Agent, or Firm*—Edwards Angell Palmer & Dodge LLP

(57) ABSTRACT

Both RF communication and contact serial communication can be performed with the use of: communication protocol storage unit for storing a communication protocol for performing communication with an external communication apparatus; a coil terminal section provided with two coil terminals for performing communication with the external communication apparatus with an RF signal; a contact communication terminal section provided with a first communication terminal, a second communication terminal, a power supply voltage terminal and a ground terminal as contact communication terminals for performing contact communication with the external communication apparatus; and connection control unit for causing the power supply voltage terminal and a power supply of an internal switch circuit to be in contact or non-contact with each other depending on the level of voltage applied to the first and second communication terminals.

12 Claims, 11 Drawing Sheets

U.S. PATENT DOCUMENTS 6,585,166 B1 * 7/2003 Ookawa et al. ............. 235/492
6,899,277 B2 * 5/2005 Kawano et al. ............. 235/492

FOREIGN PATENT DOCUMENTS

DE 19531372 A1 2/1997
JP 2000-276566 10/2000
WO WO-99/42952 A1 8/1999

OTHER PUBLICATIONS

European Search Report dated Nov. 13, 2009, issued on the corresponding European Patent Application No. 07 11 9657.0.

* cited by examiner

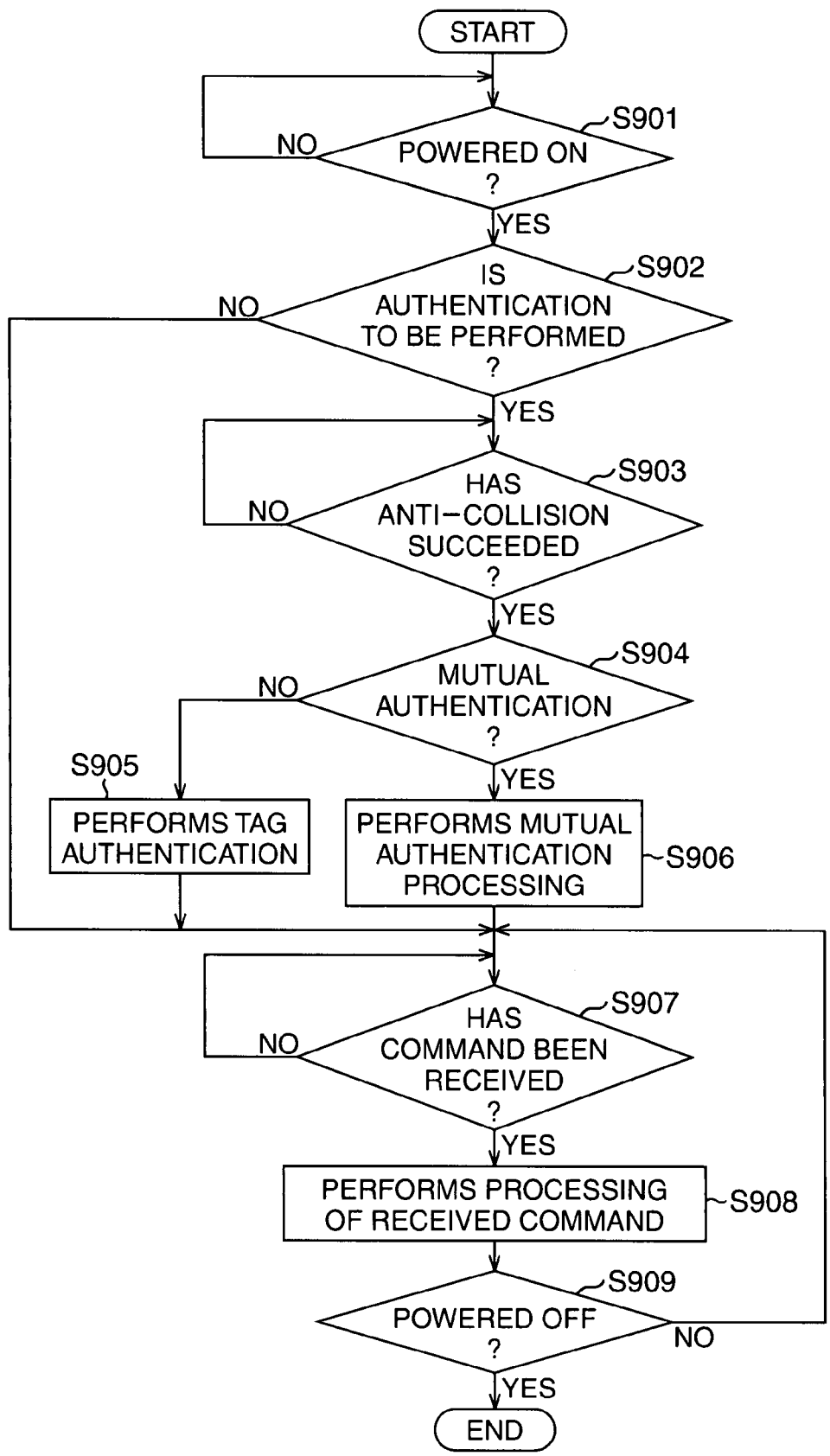

DATA CARRIER AND DATA CARRIER SYSTEM

CROSS-REFERENCE TO RELATED APPLICATIONS

This application is based upon and claims the benefit of priority from the prior Japanese Patent Application Nos. 2006-296512, filed on Oct. 31, 2006 and 2007-247642, filed on Sep. 25, 2007, the entire contents of which are incorporated herein by reference.

BACKGROUND OF THE INVENTION

1. Field of the Invention

The present invention relates to a data carrier and a data carrier system, and more particularly, to a technique preferable for being used for performing both RF communication and contact serial communication between a data carrier and a reader/writer apparatus.

2. Description of the Related Art

Conventionally, a data carrier system has been put to practical use in various fields which is configured by a data carrier and a reader/writer apparatus and in which data is given and received between the data carrier and the reader/writer apparatus. In such a data carrier system, the data carrier obtains operating power by receiving the alternating magnetic field at the carrier frequency provided by the reader/writer apparatus via an antenna circuit, with an antenna included in the data carrier.

An inquiry signal including a command or data is transmitted by modulating the magnetic field provided by the reader/writer apparatus, and the data carrier demodulates it to receive the command or the data transmitted from the reader/writer apparatus.

On the other hand, in the case of transmitting data from the data carrier to the reader/writer apparatus, an on/off operation of a well-known load switch is performed for load connected to an antenna circuit included in the data carrier, in accordance with the contents of a response signal to be returned, and thereby, the response is returned. In this way, as a frequency for returning a response from the data carrier, the subcarriers of both sidebands of the carrier frequency of the alternating magnetic field provided from the antenna circuit of the reader/writer apparatus are used.

The data carrier is configured to be provided with a storage section for storing information and an antenna for contactlessly transmitting or transmitting/receiving information in order to contactlessly transmit and receive to and from the reader/writer apparatus with the use of a magnetic field or a radio wave. The data carrier is given various names such as RFID, IC tag, ID tag, RF tag, wireless tag, electronic tag and transponder, and is used in various fields.

As an application example of the data carrier system as described above, it is common that a data carrier is provided for a vending machine, a game machine, an electricity meter, a gas meter, a water meter, a domestic appliance, OA equipment, production equipment and the like, and information about the electronic equipment, such as operation history, sales recording and an amount of use, is stored in the storage section of the data carrier.

Since the data carrier is used in various fields, the form of usage varies accordingly. Among the various usage forms, there is proposed a "complex data carrier" capable of selectively performing both of RF communication and contact serial communication with a reader/writer apparatus (for example, see Patent Document 1).

The "complex data carrier" described in Patent Document 1 is configured as shown in FIG. 11. In FIG. 11, reference numeral 51 denotes a contact point terminal section, reference numeral 52 denotes an antenna coil section, reference numeral 53 denotes a direct current voltage generation section, reference numeral 54 denotes a signal conversion section, reference numeral 55 denotes a signal opening/closing section, reference numeral 56 denotes a first row of signal lines, reference numeral 57 denotes a second row of signal lines, and reference numeral 58 denotes a third row of signal lines.

The contact point terminal section 51 has six terminals: an I/O control terminal, an R/W control terminal, a data (serial) terminal, a write enable terminal, a V+ (power supply) terminal and a GND (ground) terminal. These first five terminals of the contact point terminal section 51 are connected to an MPU 59 and the like constituting an IC section, via the third row of signal lines 58.

The contact point terminal section 51 is a contact terminal section for exchanging data and receiving energy. A GND terminal within a contact terminal for receiving energy is electrically connected to a GND terminal in an integrated circuit for the complex data carrier via a GND connection line. The integrated circuit for the complex data carrier is configured by the direct current voltage generation section 53, the signal conversion section 54 and the signal opening/closing section 55.

Two lead wires of the antenna coil section 52 are connected to the direct current voltage generation section 53 and the signal conversion section 54 in parallel. The antenna coil section 52 is a non-contact terminal section for exchanging data and receiving energy. Though the antenna coil section 52 is used both for exchanging data and receiving energy, data exchange and energy receiving are separated in the frequency domain and/or in the time domain. In the case of separation in the frequency domain, data exchange is performed via a high-pass filter (not shown), and energy receiving is performed via a low-pass filter (not shown). In the case of separation the time domain, connection is switched, for example, by a switching circuit (not shown).

The direct current voltage generation section 53 converts alternating current voltage induced in the antenna coil section 52 to direct current voltage. The direct current voltage obtained by this conversion is used for opening/closing control of the signal opening/closing section 55. To the SE (select enable) terminal of the signal opening/closing section 55, the direct current voltage (V'+) is outputted.

The direct current voltage obtained by this conversion is also power supply for receiving energy. The direct current voltage (V'+) generated by the direct current voltage generation section 53 is supplied to the signal opening/closing section 55, the signal conversion section 54, and the like. That is, power is supplied to the integrated circuit for the complex data carrier. In the case of contactlessly causing an IC card to operate not with the use of the contact point terminal section 51 but with the use of the antenna coil section 52, power is also supplied to the MPU and the like of the IC card via a diode D. Sufficient power is supplied to the antenna coil section 52, and the direct current voltage generation section 53 has a function of stabilizing the direct current voltage to a predetermined voltage value in the use of an ordinary IC card.

The signal conversion section 54 performs demodulation of a signal from the MPU or the like and/or modulation of a signal to the MPU or the like. To the SG (signal) terminal of the signal conversion section 54, the two lead wires of the antenna coil section 52 are connected. A signal demodulated by the signal conversion section 54 is outputted to the first row of signal lines 56. A signal to be modulated by the signal conversion section 54 is inputted from the first row of signal lines 56.

When the direct current voltage of the direct current voltage generation section 53 is predetermined voltage, the signal opening/closing section 55 electrically connects the first row of signal lines 56 and the second row of signal lines 57 with each other, and otherwise, it electrically disconnects them. The signal opening/closing section 55 performs the operation of electrically connecting them or the operation of disconnecting them depending on the direct current voltage inputted to the SE terminal.

Each section of the complex data carrier as described above operates by the voltage applied in a contact state or the voltage applied in a non-contact state. FIG. 12 shows a main part constituting a circuit for controlling rectified voltage VDH which is the main power supply of the analog section, in a power supply control section 124 provided for an RF analog section 120. In FIG. 12, reference numeral 1241 denotes a reference voltage generation circuit; reference numeral 1242 denotes a comparator; reference numeral 1243 denotes a Vcc level detection/set & reset circuit; and reference numeral 1244 denotes a transistor circuit for switch.

The reference voltage generation circuit 1241 outputs reference voltage Vref of a constant value (for example, 2.5 V) irrespective of the level of the rectified voltage VDH of the analog section. The Vcc level detection/set & reset circuit 1243 measures a VDD level, and causes the complex data carrier to be in an operating state (set state) if the magnitude of the VDD voltage applied to the VDD terminal is a predetermined value or higher. If the magnitude is the predetermined value or lower, it causes the complex data carrier to be in a non-operating state (reset state)

The comparator 1242 is a circuit for comparing the reference voltage Vref and the power supply voltage VDD. If the result of comparison is VDD≧Vref, then the transistor circuit for switch 1244 performs an off-operation, and as shown by arrow in FIG. 12, the state of the rectified voltage VDH to the VDD becomes an on-state. If the result of comparison by the comparator 1242 is VDD≦Vref, then the power supply control section 124 is in an on-state.

Patent Document 1: Japanese Patent Application Laid-Open No. 2000-276566

In the data carrier capable of performing both RF communication and contact serial communication as described above, the contact point terminal section 51 is provided with six terminals of an I/O control terminal, an R/W control terminal, a data (serial) terminal, a write enable terminal, a V+ (power supply) terminal and a GND (ground) terminal to realize direct communication.

The cost for forming terminals required for performing contact communication increases in proportion to the number of terminals to be formed. Furthermore, when contact communication is performed, the risk of occurrence of contact failure increases in proportion to the number of terminals. Therefore, it is desirable that the number of terminals formed in a data carrier is as small as possible.

SUMMARY OF THE INVENTION

In view of the above problem, the object of the present invention is to provide a data carrier capable of performing both RF communication and contact serial communication with the use of four terminals as contact communication terminals.

The data carrier of the present invention is characterized in comprising: communication protocol storage means for storing a communication protocol for performing communication with an external communication apparatus; a coil terminal section provided with two coil terminals for performing communication with the external communication apparatus with an RF signal; a contact communication terminal section provided with a first communication terminal, a second communication terminal, a power supply voltage terminal and a ground terminal as contact communication terminals for performing contact communication with the external communication apparatus; and connection control means for causing the power supply voltage terminal and the power supply of the internal circuit to be in contact or non-contact with each other depending on the level of voltage applied to the first and second communication terminals.

The data carrier of the present invention is further characterized in comprising: command control means for controlling a command used in an RF communication protocol performed via the coil terminal section or a contact serial communication protocol performed via the contact communication terminal section; connection selection means for selectively connecting any one of the coil terminal section and the contact communication terminal section to the command control means; command holding means for holding at least an authentication command for performing authentication with the external communication apparatus, a proximity communication command for performing proximity communication with the external communication apparatus, and a vicinity communication command for performing vicinity communication with the external communication apparatus; authentication command analysis means for analyzing the level of authentication to be performed with the external communication apparatus, from an inquiry signal received via the coil terminal section; authentication command selection means for selecting an authentication command to be used in authentication processing performed with the external communication apparatus, on the basis of the result of the analysis by the authentication command analysis means; and authentication command reading means for reading the authentication command selected by the authentication command selection means, from the command holding means; wherein the command control means performs communication with the use of the communication protocol stored in the communication protocol storage means no matter which of the coil terminal section and the contact communication terminal section is selected.

The data carrier of the present invention is further characterized in that there is provided an operating voltage supply circuit supplying operating voltage supplied from external equipment when the contact serial communication is performed, to a reference voltage generation circuit provided for a power supply control section constituting an RF analog section generating operating power used when communication is performed with an external communication apparatus with an RF signal.

The data carrier system of the present invention is characterized in comprising: a data carrier system comprising a data carrier and an external communication apparatus communicating with the data carrier, wherein said data carrier includes: communication protocol storage means for storing a communication protocol for performing communication with an external communication apparatus; a coil terminal section provided with two coil terminals for performing communication with the external communication apparatus with an RF signal; a contact communication terminal section provided with a first communication terminal, a second communication terminal, a power supply voltage terminal and a ground terminal as contact communication terminals for performing contact communication with the external communication apparatus; and connection control means for causing the power supply voltage terminal and the power supply of the internal circuit to be in contact or non-contact with each other depending on the level of voltage applied to the first and second communication terminals.

The data carrier system of the present invention is further characterized in comprising: command control means for controlling a command used in an RF communication protocol performed via the coil terminal section or a contact serial communication protocol performed via the contact communication terminal section; connection selection means for selectively connecting any one of the coil terminal section and the contact communication terminal section to the command control means; command holding means for holding at least an authentication command for performing authentication with the external communication apparatus, a proximity communication command for performing proximity communication with the external communication apparatus, and a vicinity communication command for performing vicinity communication with the external communication apparatus; authentication command analysis means for analyzing the level of authentication to be performed with the external communication apparatus, from an inquiry signal received via the coil terminal section; authentication command selection means for selecting an authentication command to be used in authentication processing performed with the external communication apparatus, on the basis of the result of the analysis by the authentication command analysis means; and authentication command reading means for reading the authentication command selected by the authentication command selection means, from the command holding means; wherein the command control means performs communication with the use of the communication protocol stored in the communication protocol storage means no matter which of the coil terminal section and the contact communication terminal section is selected.

The data carrier system of the present invention is further characterized in that there is provided an operating voltage supply circuit supplying operating voltage supplied from external equipment when the contact serial communication is performed, to a reference voltage generation circuit provided for a power supply control section constituting an RF analog section generating operating power used when communication is performed with an external communication apparatus with an RF signal.

BRIEF DESCRIPTION OF THE DRAWINGS

FIG. 9 is a flowchart illustrating an example of communication by a data carrier system using the data carrier of First Embodiment;

DETAILED DESCRIPTION OF THE PREFERRED EMBODIMENTS

First Embodiment

An embodiment of the data carrier system of the present invention will be described below with reference to drawings.

Figure 1:
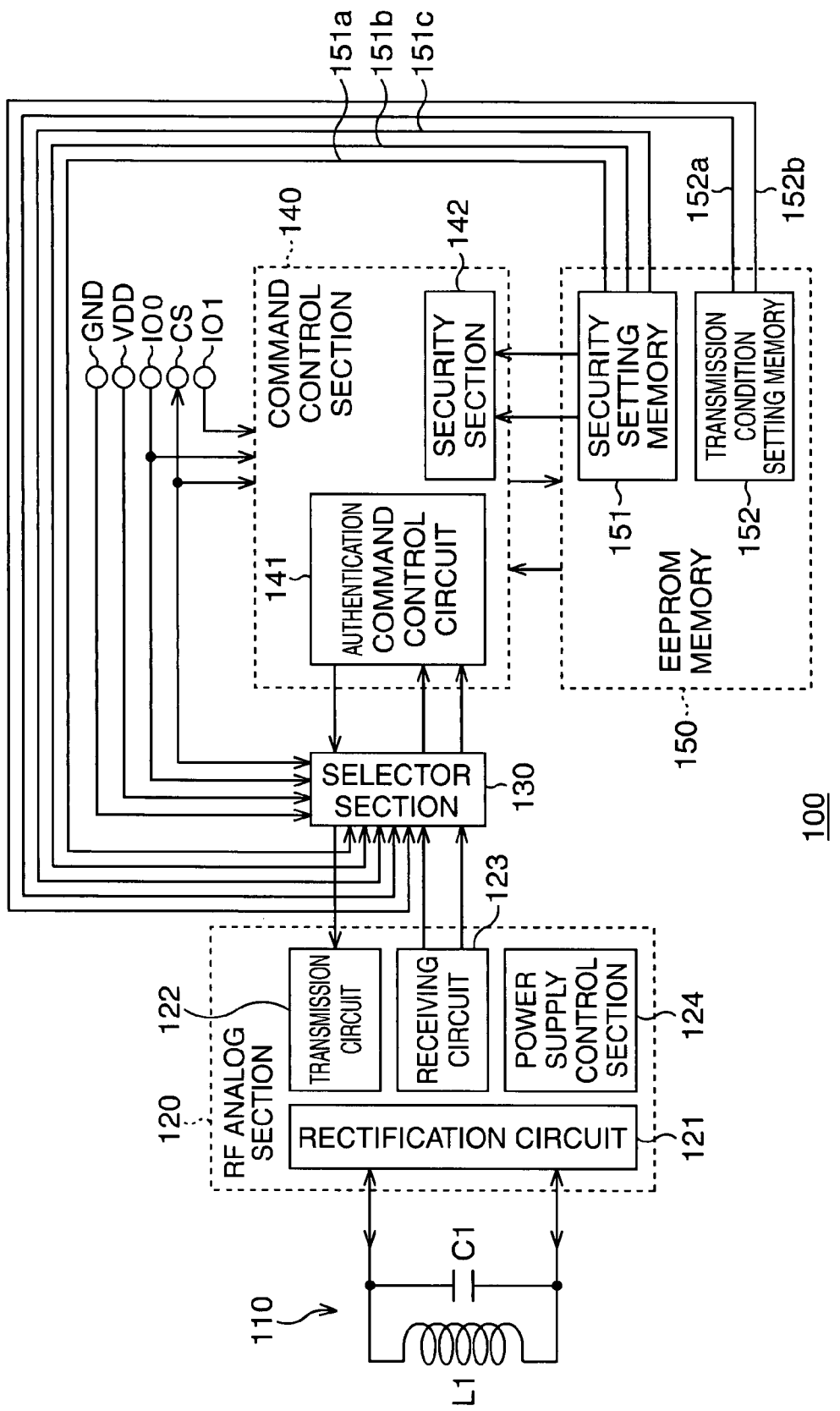
FIG. 1 is a block diagram showing First Embodiment of the present invention and showing a configuration example of a data carrier.

As shown in FIG. 1, a data carrier 100 of this embodiment is configured by an antenna circuit 110, an RF analog section 120, a selector section 130, a command control section 140, a storage section 150 (EEPROM memory), a first contact terminal CS, a second contact terminal IO0, a third contact terminal VDD, a fourth contact terminal GND, a data input/output terminal IO1 and the like. Here, as the first contact terminal CS, the third contact terminal VDD or the fourth contact terminal GND can be used in common, and the first contact terminal CS can be regarded as an internal terminal. Therefore, it is the four terminals of the second contact terminal IO0, the third contact terminal VDD, the fourth contact terminal GND and the data input/output terminal IO1 that are used for performing contact communication.

Due to such a configuration, the data carrier of this embodiment is configured to be capable of performing both RF communication and contact serial communication. When contact serial communication is performed, the second contact terminal IO0 is used for input of a serial clock, and input/output terminal IO1 is used for input/output of multi-purpose data.

The antenna circuit 110 is configured by a parallel resonant circuit constituted by a coil L1 and a capacitor C1.

The RF analog section 120 is configured by a rectification circuit 121, a transmission circuit 122, a receiving circuit 123, a power supply control section 124 and the like.

The selector section 130 is for switching RF communication and contact serial communication. The selector section 130 of this embodiment is internally provided with a VDD switch circuit 200 (see FIG. 2) to make it possible to connect the third contact terminal VDD to the internal circuit or, on the contrary, to disconnect the third contact terminal VDD from the internal circuit.

Figure 2:
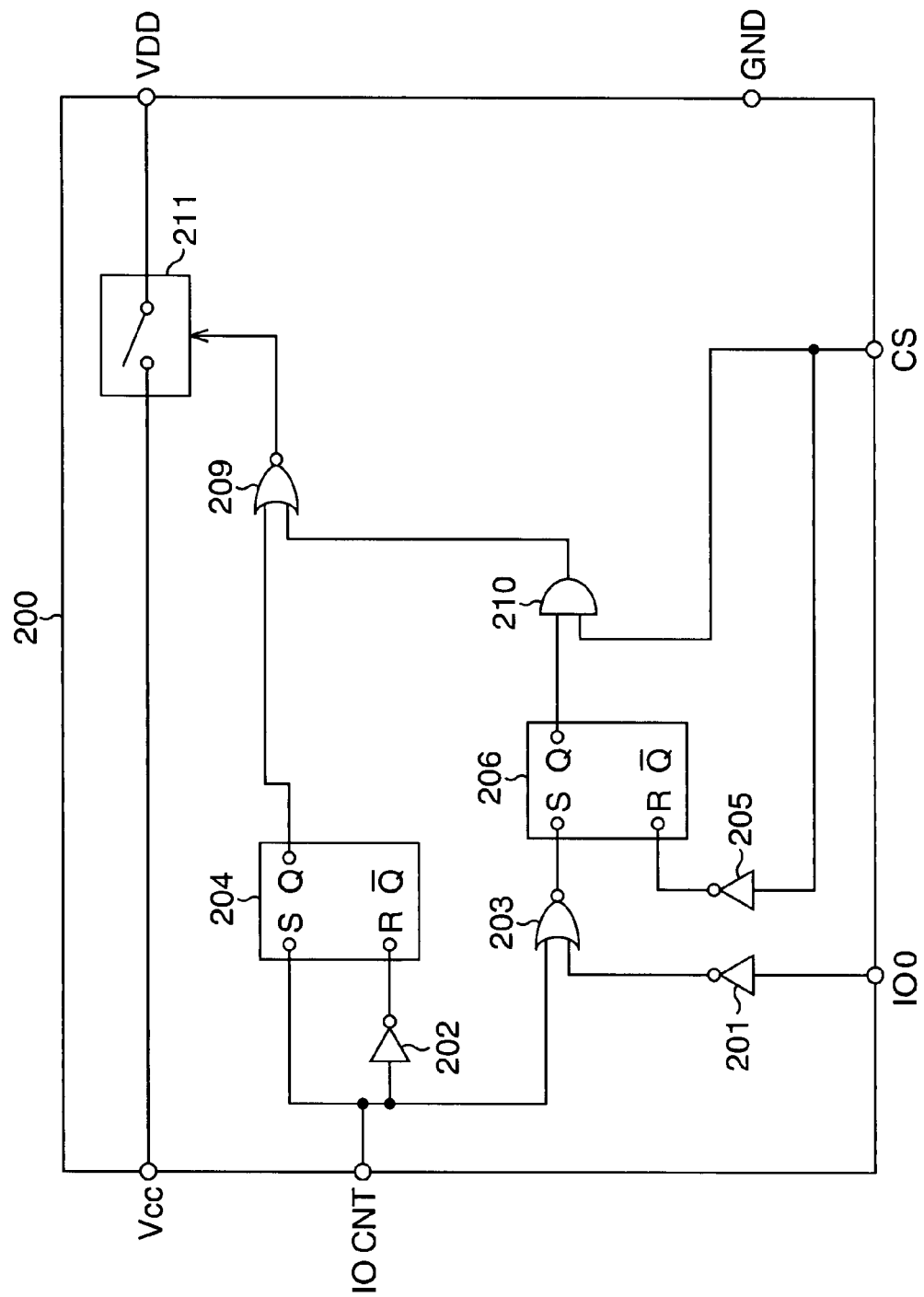
FIG. 2 is a diagram showing a configuration example of a VDD switch circuit.

FIG. 2 shows a configuration example of the VDD switch circuit 200.

As shown in FIG. 2, to the VDD switch circuit 200 of this embodiment, the first contact terminal CS, the second contact terminal IO0, the third contact terminal VDD, the fourth contact terminal GND, an internal power supply terminal VCC, an internal signal terminal IO CNT to which an internal signal of the LSI is inputted, and the like are connected.

Furthermore, inside the VDD switch circuit 200, there are provided R-S flip-flops 206 and 204, a switching circuit 211 and the like as main logic circuits. One fixed terminal of the switching circuit 211 is connected to the third contact terminal VDD, and the other fixed terminal is connected to the internal power supply terminal VCC.

A movable terminal of the switching circuit 211 connected as described above performs an on/off operation on the basis of a switching signal outputted from a NOR circuit 209. Thereby, in the case of an on-operation being performed, operating voltage inputted from the third contact terminal VDD is given to the internal power supply terminal VCC, and the data carrier 100 operates by externally provided power supply. During an off-operation being performed, the third contact terminal VDD is disconnected from the internal circuit. In this case, the data carrier 100 operates by power supply generated internally.

Next, description will be made on an example of the switching operation of connecting the third contact terminal VDD to the internal circuit or disconnecting it from the internal circuit as described before.

The internal signal terminal IO CNT and a set terminal S of the R-S flip-flop 204 are connected to each other. A reset terminal R of the R-S flip-flop 204 is connected via a NOT circuit 202. In this embodiment, the internal signal terminal IO CNT is fixed at "Low".

The internal signal terminal IO CNT is also connected to one terminal of the NOR circuit 203. To the other terminal of the NOR circuit 203, the second contact terminal IO0 is connected via a NOT circuit 201. Output from the NOR circuit 203 is connected to a set terminal S of the R-S flip-flop 206.

To a rest terminal R of the R-S flip-flop 206, the first contact terminal CS is connected via a NOT circuit 205. An output terminal Q of the R-S flip-flop 206 is connected to one terminal of an AND circuit 210. To the other terminal of the AND circuit 210, the first contact terminal CS is connected, and output from it is connected to the other input terminal of the NOR circuit 209.

Next, description will be made on the switching operation of the VDD switch circuit 200 configured as described above.

(A) In the Case of the First Contact Terminal CS="L"

In this case, since input to the NOR circuit 209 is "L" and "L", the switching circuit 211 is in an off-state. Therefore, when the first contact terminal CS is "L", the data carrier 100 of this embodiment is used for RF. That is, power supply Vcc is rectified inside the LSI. The result is: Vcc="H" level; and the third contact terminal VDD=open.

(B) In the Case of the First Contact Terminal CS="H" and the Second Contact Terminal IO0="H"

In this case, since input to the NOR circuit 209 is "L" and "H", output is "L". Thereby, the switching circuit 211 operates an on-operation. Therefore, when the first contact terminal CS is "H", the data carrier 100 of this embodiment is used for contact communication. The power supply VCC is externally provided from the third contact terminal VDD. The result is: Vcc=the third contact terminal VDD; and Vcc="H" level.

(C) In the Case of the First Contact Terminal CS="H" and the Second Contact Terminal IO0="L"

In this case, since input to the R-S flip-flop 206 is "L" and "L" at both the set terminal S and the reset terminal R, the R-S flip-flop 206 keeps an immediately previous state. Therefore, the off-state is kept if the immediately previous state is (A), and the on-state is kept if the immediately previous state is (B).

The command control section 140 has an authentication command control circuit 141 and a security section 142. The storage section 150 has a security setting memory 151 and a transmission condition setting memory 152. Commands stored in the security setting memory 151 and the transmission condition setting memory 152 are used in RF communication and contact serial communication in common.

Figure 7:
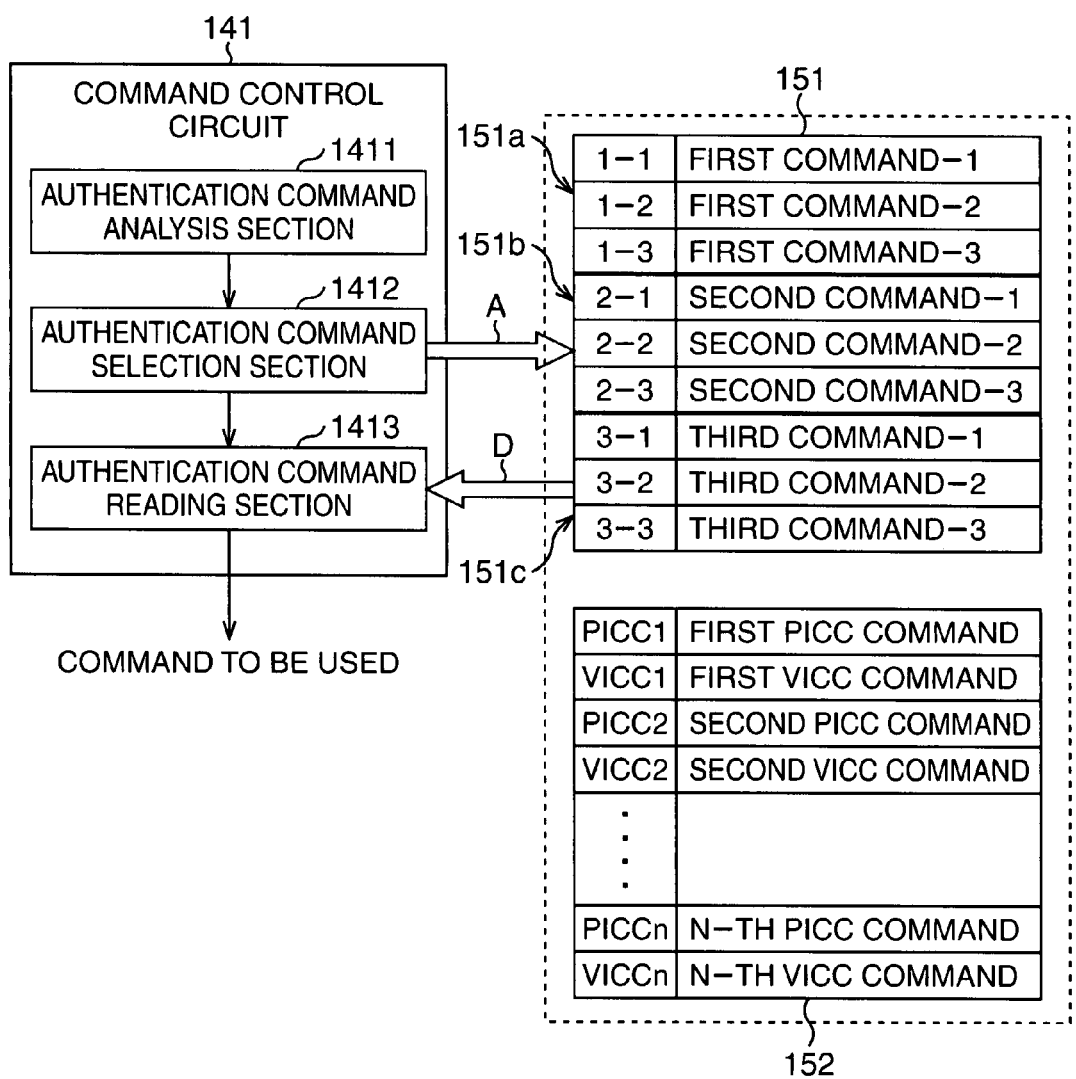
FIG. 7 is a diagram showing a configuration example of a command control circuit of First Embodiment and illustrating an example of reading any command corresponding to a security level.

FIG. 7 shows an example of the commands. In this embodiment, the security setting memory 151 is provided with a first security area 151a, a second security area 151b and a third security area 151c as shown in FIG. 7. In the example of FIG. 7, "1 of a first command" is stored in the first address 1-1 of the first security area 151a. Furthermore, "2 of the first command" is stored in the second address 1-2 of the first security area 151a. Furthermore, "3 of the first command" is stored in the third address 1-3 of the first security area 151a.

Furthermore, "1 of a second command" is stored in the first address 2-1 of the second security area 151b. Furthermore, "2 of the second command" is stored in the second address 2-2 of the second security area 151b. Furthermore, "3 of the second command" is stored in the third address 2-3 of the second security area 151b.

Furthermore, "1 of a third command" is stored in the first address 3-1 of the third security area 151c. Furthermore, "2 of the third command" is stored in the second address 3-1 of the third security area 151c. Furthermore, "3 of the third command" is stored in the third address 3-3 of the third security area 151c.

In response to control by the command control section 140, any of 1 to 3 of the first command, 1 to 3 of the second command and 1 to 3 of the third command is read from the security setting memory 151 and given to the selector section 130.

Figure 5:
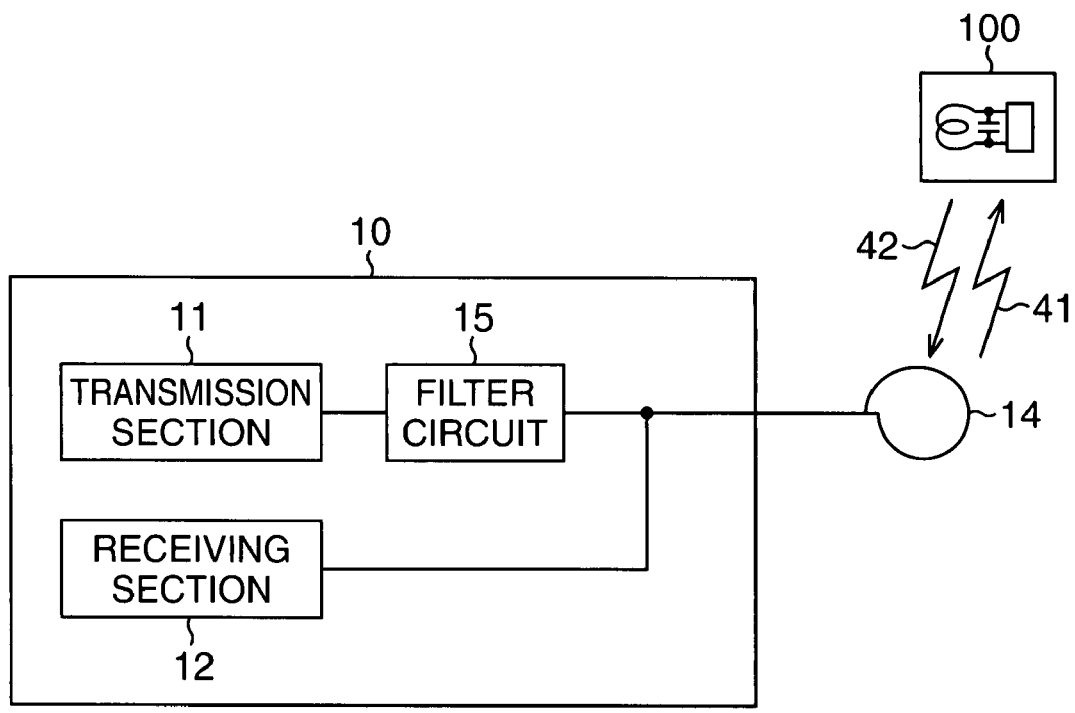
FIG. 5 is a diagram illustrating the schematic configuration of a data carrier system configured by the reader/writer apparatus and the data carrier.

As shown in FIG. 5, a reader/writer apparatus 10 which communicates with the data carrier 100 of this embodiment is configured by a transmission section 11, a receiving section 12, an antenna circuit 14, a filter circuit 15, and the like. A command or data is transmitted from the antenna circuit 14 to the data carrier 100, and RF communication is performed between the reader/writer apparatus 10 and the data carrier 100.

The transmission section 11 is for generating a transmission signal configured by a command or data to be transmitted to the data carrier 100, and it modulates a predetermined carrier frequency $f_0$ (13.56 MHz) to generate the transmission signal. The receiving section 12 decodes the subcarrier frequency transmitted from the data carrier 100 to demodulate the data.

The antenna circuit 14 transmits to the data carrier 100 a transmission signal outputted from the transmission section 11 as well as receiving a response signal transmitted from the data carrier 100. The above configuration is a common configuration of a data carrier 100 used in a data carrier system. The data carrier 100 of this embodiment is characterized in that both proximity data communication and vicinity data communication are enabled.

As shown in FIG. 7, the authentication command control circuit 141 of this embodiment has an authentication command analysis section 1411, an authentication command selection section 1412 and an authentication command reading section 1413.

The authentication command analysis section 1411 is for determining whether an inquiry signal 41 sent from the reader/writer apparatus 10 is "a direct method command", "a tag authentication method command", "a mutual authentication method command", "a PICC command" or "a VICC command", and outputs the result of the determination to the authentication command selection section 1412.

The authentication command selection section 1412 selects a security area command or a security level command used in a response signal 42 to be transmitted to the reader/writer apparatus 10, on the basis of the result of command analysis sent from the authentication command analysis section 1411. It specifies an address A in which the command of the type to be selected is stored, on the security setting memory 151 or the transmission condition setting memory 152.

The authentication command reading section 1413 reads data D of a security area command or a transmission condition setting area command selected by the authentication command selection section 1412 from the security setting memory 151 or the transmission condition setting memory 152, as a command to be used for performing communication with the reader/writer apparatus 10.

Then, the command read from any of the security setting memory 151 and the transmission condition setting memory 152 is outputted to the selector section 130, as shown in FIG. 1.

Figure 6:
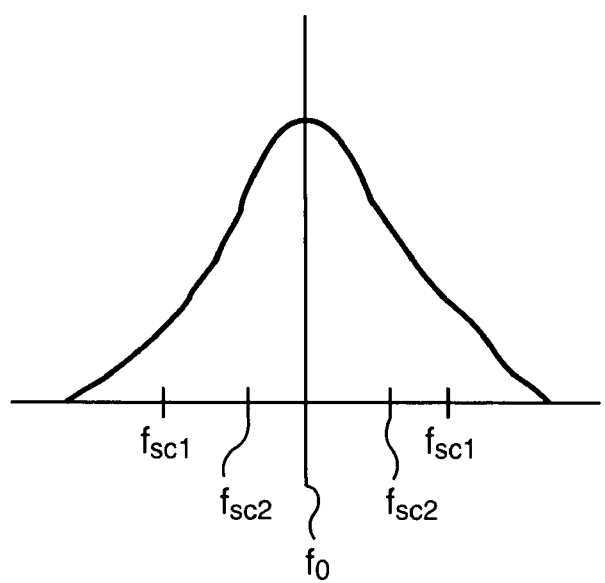
FIG. 6 is a waveform diagram illustrating an example of a data carrier signal.

When RF communication is performed by the data carrier 100 of this embodiment, a first subcarrier frequency fsc1 and a second subcarrier frequency fsc2, which are the subcarriers of both sidebands of the carrier frequency of the alternating magnetic field provided from the antenna circuit of the reader/writer apparatus, are used as the frequency of a response signal 42 to be returned as a reply to an inquiry signal 41 transmitted from the reader/writer apparatus 10, as shown in FIG. 6.

The data carrier of this embodiment is configured to be able to selectively use both of a command for vicinity communication (VICC command) and a command for proximity communication (PICC command) in the case of performing RF communication.

As shown in the carrier frequency diagram of FIG. 6, the first subcarrier frequency fsc1 (847.5 kHz) is used for an original command for proximity communication (PICC command), and the second subcarrier frequency fsc2 (437.75 kHz) is used for a command for vicinity communication (VICC) in this embodiment. As for the receiving characteristics, the center frequency is 13.56 MHz, the communication speed is 105.94 kbps, and the modulation method is ASK (NRZ). As for the transmission characteristics, the center frequency is 13.56 MHz, the communication speed is 105.94 kbps, and the modulation method is BPSK (NRZ).

In this embodiment, the subcarrier intensity can be changed by changing the magnitude of the load. As for the degree of the change, the intensity can be changed to eight levels for each of the PICC command and the VICC command. The relative ratio between the PICC command and the VICC command is adapted to be almost 1:3.

Next, description will be made on the modulation method for RF communication and the modulation method for contact serial communication, with reference to FIGS. 3A, 3B, 4A and 4B.

Figure 3A:
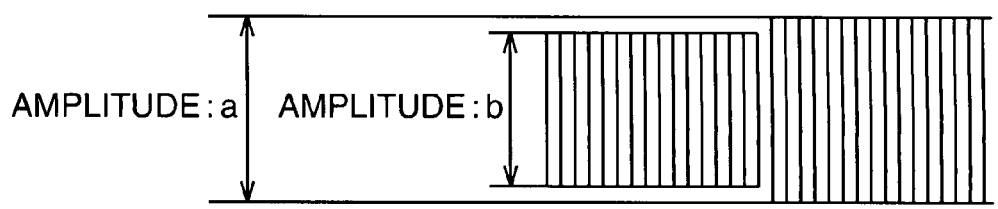
FIG. 3A is a modulation method used in the case of transmitting an inquiry signal from the reader/writer apparatus to the data carrier.
Figure 3B:
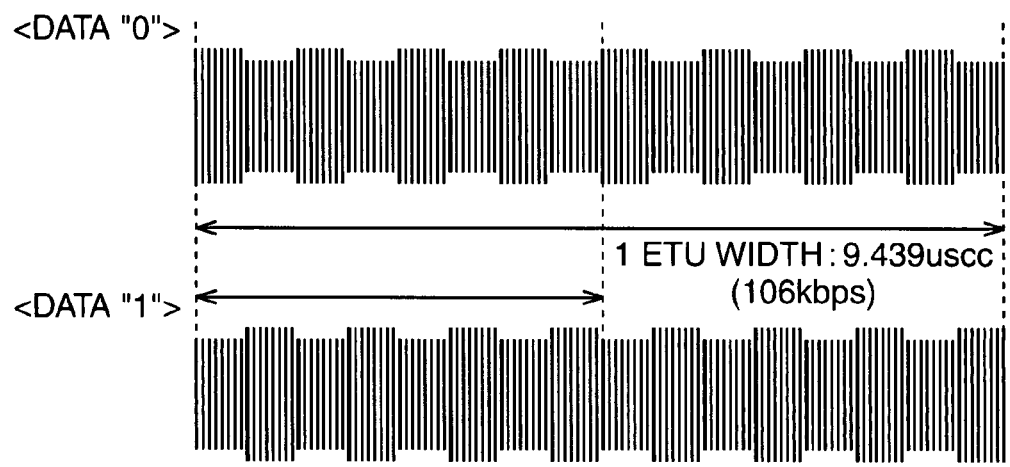
FIG. 3B is a modulation method used in the case of transmitting a response signal from the data carrier to the reader/writer apparatus.

FIGS. 3A and 3B illustrates a modulation method used in the case of performing RF communication. FIG. 3A shows a modulation method used in the case of transmitting an inquiry signal 41 (see FIG. 5) from the reader/writer apparatus 10 to the data carrier 100.

In this case, the modulation is performed with (i) the center frequency: 13.56 MHz, (ii) the communication speed: 105.94 kbps, (iii) the modulation method: ASK (NRZ): and (iv) the modulation speed: 10 to 30%. Data "0" is assumed to have the amplitude of a and the width of 128 waves of the carrier (13.56 MHz). Data "1" is assumed to have the amplitude of b and the width of 128 waves of the carrier (13.56 MHz).

Meanwhile, in the case of transmitting a response signal 42 from the data carrier 100 to the reader/writer apparatus 10, the following are assumed, as shown in FIG. 3B: (i) the center frequency: 13.56 MHz; (ii) the communication speed: 105.94 kbps; (iii) the modulation means: load modulation (the reader/writer apparatus is assumed to perform continuous high field emission at the time of load modulation); subcarrier: 847.5 kHz (option: 423.75 kHz); and (iv) the modulation method: BPSK.

Figure 4A:
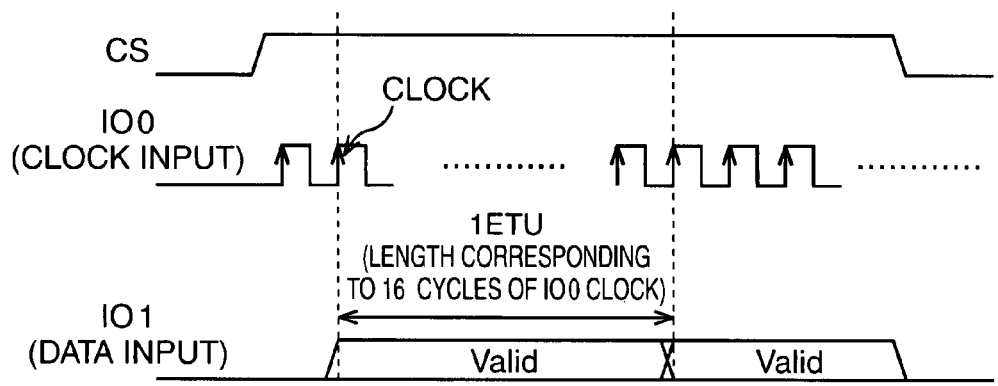
FIG. 4A shows the timing of receiving by the data carrier in contact serial communication performed between the data carrier and the reader/writer apparatus.
Figure 4B:
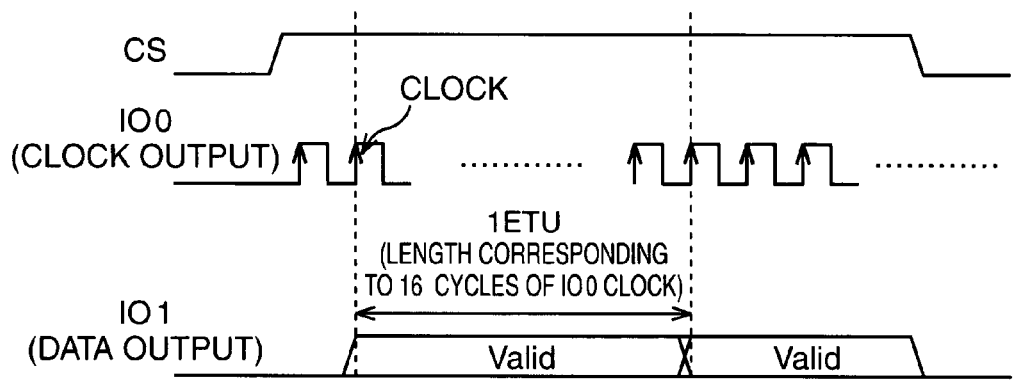
FIG. 4B shows the timing of transmission from the data carrier in contact serial communication performed between the data carrier and the reader/writer apparatus.

In the case of contact serial communication, modulation is performed by a method as shown in FIGS. 4A and 4B. FIG. 4A shows a receiving tag to the data carrier 100. FIG. 4B shows the timing of transmission from the data carrier 100. In FIGS. 4A and 4B, "CS" shows a switching signal for switching between a non-contact/contact operation (which occurs inside Vdd) mode and an external power supply operation mode.

As shown in FIG. 4A, when the first contact terminal CS changes from "0" to "1", and a clock signal ((IO0) standard: 1.695 MKHz) is inputted to the second contact terminal IO0, the clock signal is supplied to the selector section 130, and it is selected by the selector section 130 to perform contact serial communication.

Then, multipurpose data is inputted/outputted via the data input/output terminal IO1. When the multipurpose data is inputted from the data input/output terminal IO1, the multipurpose data is acquired in synchronization with the rising edge of the clock signal. In this embodiment, the time point when the multipurpose data changes from "1" to "0" first after reset is released is regarded as the reference timing. Hereinafter, the "1 ETU length" is basically assumed to be the length corresponding to sixteen cycles of the serial clock.

Next, description will be made on the timing of transmission from the data carrier 100 to the reader/writer apparatus 10.

As shown in FIG. 4B, data (IO1) is outputted in synchronization with the rise of a serial clock. In this case also, the "1 ETU length" is assumed to be the length corresponding to sixteen cycles of the serial clock.

As described above, the data carrier of this embodiment is capable of performing both RF communication and contact serial communication. Furthermore, the specifications of the communication protocol used for RF communication and those of the protocol for contact serial communication can be the same. Thereby, it is possible to eliminate the necessity of providing a command control circuit for RF communication and a command control circuit for contact serial communication separately and to simplify the control circuit. Furthermore, since it is not necessary to prepare two kinds of communication protocols, the memory capacity for storing commands can be reduced.

Next, description will be made on an example of the use of the data carrier 100 of this embodiment configured as described above, with reference to FIGS. 8A, 8B, 8C and 8D.

Figure 8A:
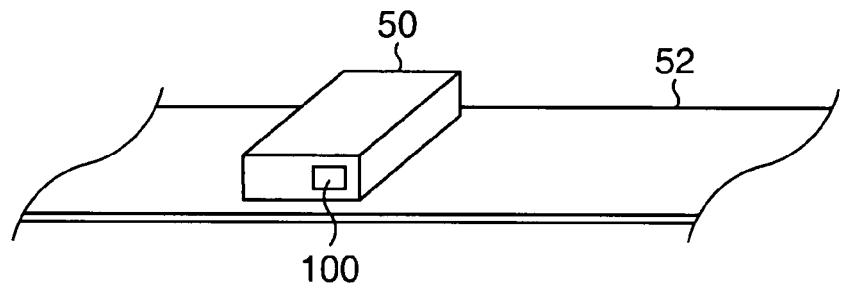
FIG. 8A is a diagram showing that a data carrier is attached to an apparatus part.

FIG. 8A shows that a data carrier 100 is attached to an apparatus part 50. For example, the apparatus part 50 is placed on a conveyor 52, and manufacture information, for example, "manufacturer's serial number", "manufacture date", "material names" and "date of shipment", is written in each process of the manufacture factory of the apparatus part 50. It is only commands for proximity communication that are used in this state.

Figure 8B:
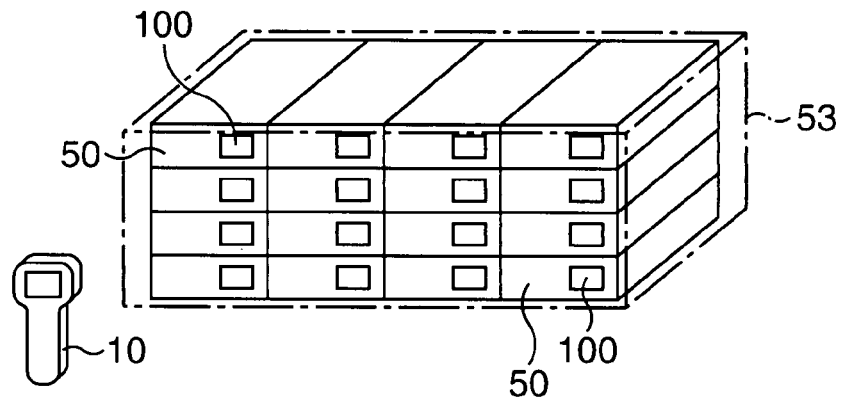
FIG. 8B is a diagram showing the state that the data carriers are put in a cardboard box to be shipped from the factory and used during distribution management.

FIG. 8B shows the state that the data carriers 100 are put in a cardboard box 53 to be shipped from the factory and used during distribution management. In this state, the reader/writer apparatus 10 transmits an inquiry signal 41 from outside the cardboard box 53. Therefore, the distance between the data carrier 100 and the reader/writer apparatus 10 is longer than the distance enabling proximity communication. Accordingly, in this state, the inquiry signal 41 is transmitted from the reader/writer apparatus 10 by a command for vicinity communication (VICC command).

The data carrier 100 to which the inquiry signal 41 of the command for vicinity communication (VICC command) has been transmitted is required to use a command for vicinity communication (VICC command) as a response signal 42 to be transmitted. In the data carrier 100 of this embodiment, both commands for proximity communication (PICC command) and commands for vicinity communication (VICC command) are stored in the transmission condition setting memory 152 as described above. Thereby, it is possible to selectively use both kinds of the commands, and it is possible to favorably use the data carrier 100 even when the apparatus part 50 is included in the cardboard box 53.

Furthermore, in this case, not only "tag authentication" in which the reader/writer apparatus 10 authenticates the data carrier 100 but also "mutual authentication" in which the data carrier 100 authenticates the reader/writer apparatus 10 is performed. The details of the "tag authentication" and the "mutual authentication" will be described later with reference to the flowchart of FIG. 9.

Figure 8C:
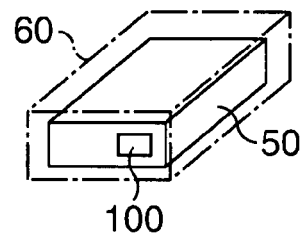
FIG. 8C is a diagram showing that a single apparatus part is included in a cardboard box.

FIG. 8C shows that a single apparatus part 50 is included in a cardboard box 60. A typical example of this state is the case where the apparatus part 50 is put on sale in a mass sales store. In this state, information such as "manufacturer's serial number", "information about maintenance", "date of shipment" and "price" is read from among various information stored in the data carrier 100.

Figure 8D:
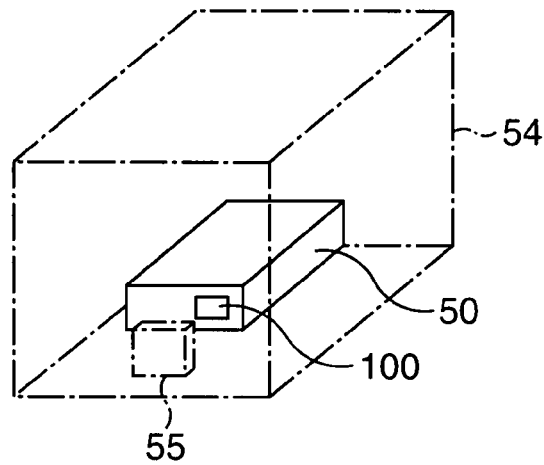
FIG. 8D is a diagram showing that the apparatus part is installed in an apparatus main body and used.

FIG. 8D shows that the apparatus part 50 is installed in an apparatus main body 54 and used. In this state, since the distance from a reader/writer apparatus 55 provided on the apparatus main body 54 side is very close, communication between the apparatus part 50 and the reader/writer apparatus 55 is communication using a command for proximity communication (PICC command).

Description will be made on an example of communication of a data carrier system using the data carrier 100 of this embodiment, with reference to the flowchart of FIG. 9.

As shown in FIG. 9, at the first step S901, the data carrier 100 is waiting to be "powered on" by an inquiry signal 41 being transmitted from the reader/writer apparatus 10.

When an inquiry signal 41 is transmitted from the reader/writer apparatus 10, and thereby, operating power occurs in the data carrier 100, the flow proceeds to step S902, where it is determined whether authentication is to be performed or not on the basis of the inquiry signal 41. As the result of the determination, if authentication is to be performed, the flow proceeds to step S903, where it is determined whether anti-collision processing has succeeded or not.

If the anti-collision processing has succeeded, the flow proceeds to step S904, where it is determined whether the authentication is "mutual authentication" or not. As a result of the determination, if the authentication is not "mutual authentication", the flow proceeds to step S905, where "tag authentication" is performed. If the authentication is "mutual authentication" as a result of the determination at step S904, the flow proceeds to step S906, where "mutual authentication" processing is performed. The security determination at steps S902 and S904 is performed by the authentication command analysis section 1411 provided for the authentication command control circuit 141 described above.

The data carrier 100 of this embodiment is configured so that the three security levels of "without authentication", "tag authentication" and "mutual authentication" can be set as described above. To set "without authentication" is advantageous in that high-speed access is enabled because the state transitions to the command receiving state at step S907 directly from "being powered on".

Since the "tag authentication" performed at step S905 is performed by an authentication command of the tag (data carrier), the reader/writer apparatus 10 can authenticate that the data carrier 100 is an authorized data carrier 100. This "mutual authentication" is referred to as a challenge-response authentication method, and a "seed value S" generated on the reader/writer apparatus 10 side is transmitted to the data carrier 100. The data carrier 100 which has received the "seed value S" responds with a calculated "authentication value N".

The reader/writer apparatus 10 verifies whether the "authentication value N" sent from the data carrier 100 is correct (a regular tag) or not. Since the "seed value S" is a scrambled value, it is changed each time.

On the other hand, the "mutual authentication" processing performed at step S906 is authentication which is mutually performed between the reader/writer apparatus 10 and the data carrier 100. As for the order of authentication in this embodiment, authentication of the data carrier 100 is performed after authentication of the reader/writer apparatus 10 is performed.

That is, when the "tag authentication" processing described at step S905 ends, a "seed value S'" generated on the data carrier 100 side is transmitted to the reader/writer apparatus 10. The reader/writer apparatus 10 which has received the "seed value S'" responds with a calculated "authentication value N'".

As described above, when the "tag authentication" processing at step S905 or the "mutual authentication" processing at step S906 ends, the flow proceeds to step S907 to wait to receive a command. Then, when a command is transmitted from the reader/writer apparatus 10, the flow proceeds to step S908, where processing in accordance with the transmitted command is executed.

Next, at step S909, it is determined whether power is off or not. If power is on, as a result of the determination, the flow returns to step S907 to wait to receive a command. If power is off, as a result of the determination at step S909, the communication processing with the reader/writer apparatus 10 ends.

As described above, the three security levels of "without authentication", "tag authentication" and "mutual authentication" are provided, and the setting can be switched by selecting the kind of command. Thereby, it is possible to select a necessary security level from among the three security levels, in the data carrier 100 which is not equipped with a CPU.

Furthermore, since the data carrier 100 of this embodiment is adapted to operate not only with a command for proximity (PICC command) but also with a command for vicinity communication (VICC command), it is possible to preferably perform all of recording of manufacture information in a manufacture factory, recording related to distribution management, and recording related to management of usage state, with one data carrier.

Thereby, it is possible to eliminate the necessity of attaching both of a data carrier for commands for proximity communication (PICC commands) and a data carrier for commands for vicinity communication (VICC commands) to consistently perform manufacture process management, distribution process management and use process management as has been done conventionally, and the cost required for information management can be substantially reduced. Furthermore, it is possible to reduce troubles such as contact failure in proportion to the reduction of the number of terminals.

Second Embodiment

Next, Second Embodiment of the present invention will be described with reference to FIG. 10.

Figure 12:
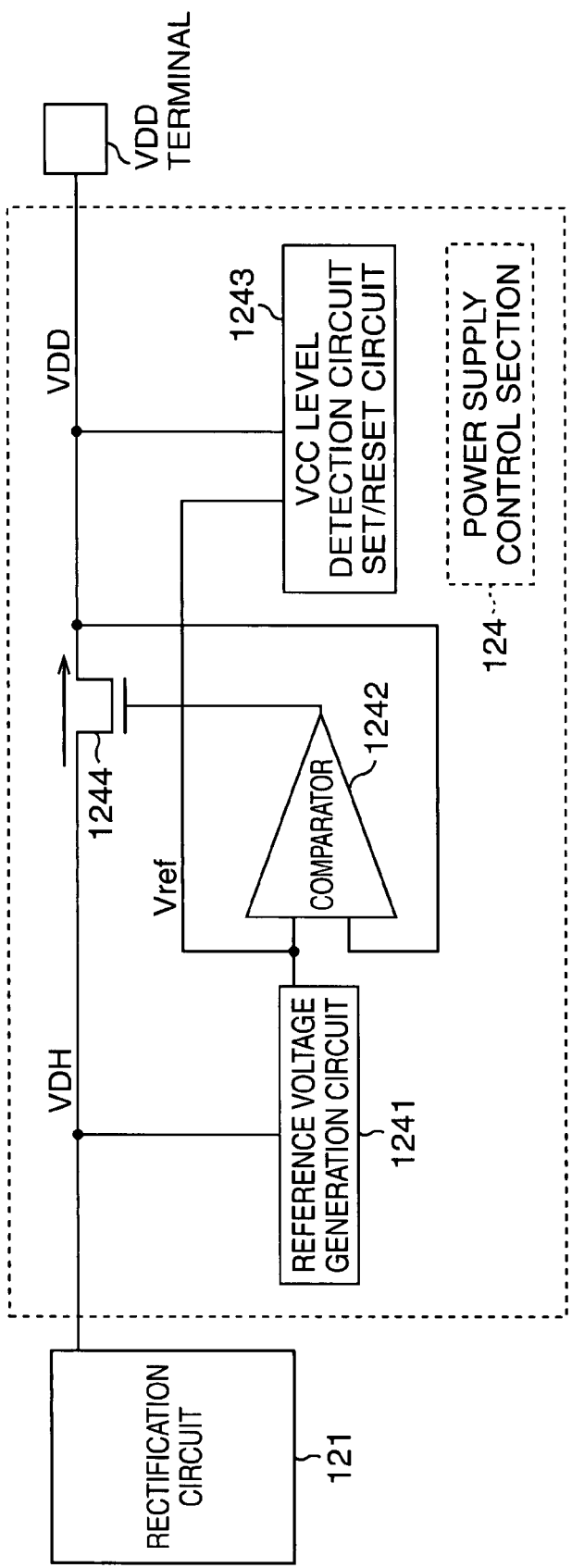
FIG. 12 is a block diagram illustrating an example of the configuration in the power supply control section of an RF analog section.

In the case of a complex data carrier, since VDH≧VDD is satisfied at the time of the non-contact operation, a circuit which uses the rectified voltage VDH as power supply can operate, as described before with reference to FIG. 12. In the example of FIG. 12, the reference voltage generation circuit 1241 can operate.

However, at the time of the contact operation, "the rectified voltage VDH=0" is satisfied, and voltage is not supplied in the direction from VDD to VDH. Therefore, there is a problem that the reference voltage generation circuit 1241 does not operate at the time of the contact operation. In order to avoid this problem, it is necessary to provide a reference voltage generation circuit 1241 which uses VDD as operating power supply. However, addition of a reference voltage generation circuit 1241 causes a problem of increasing the circuit scale.

Figure 10:
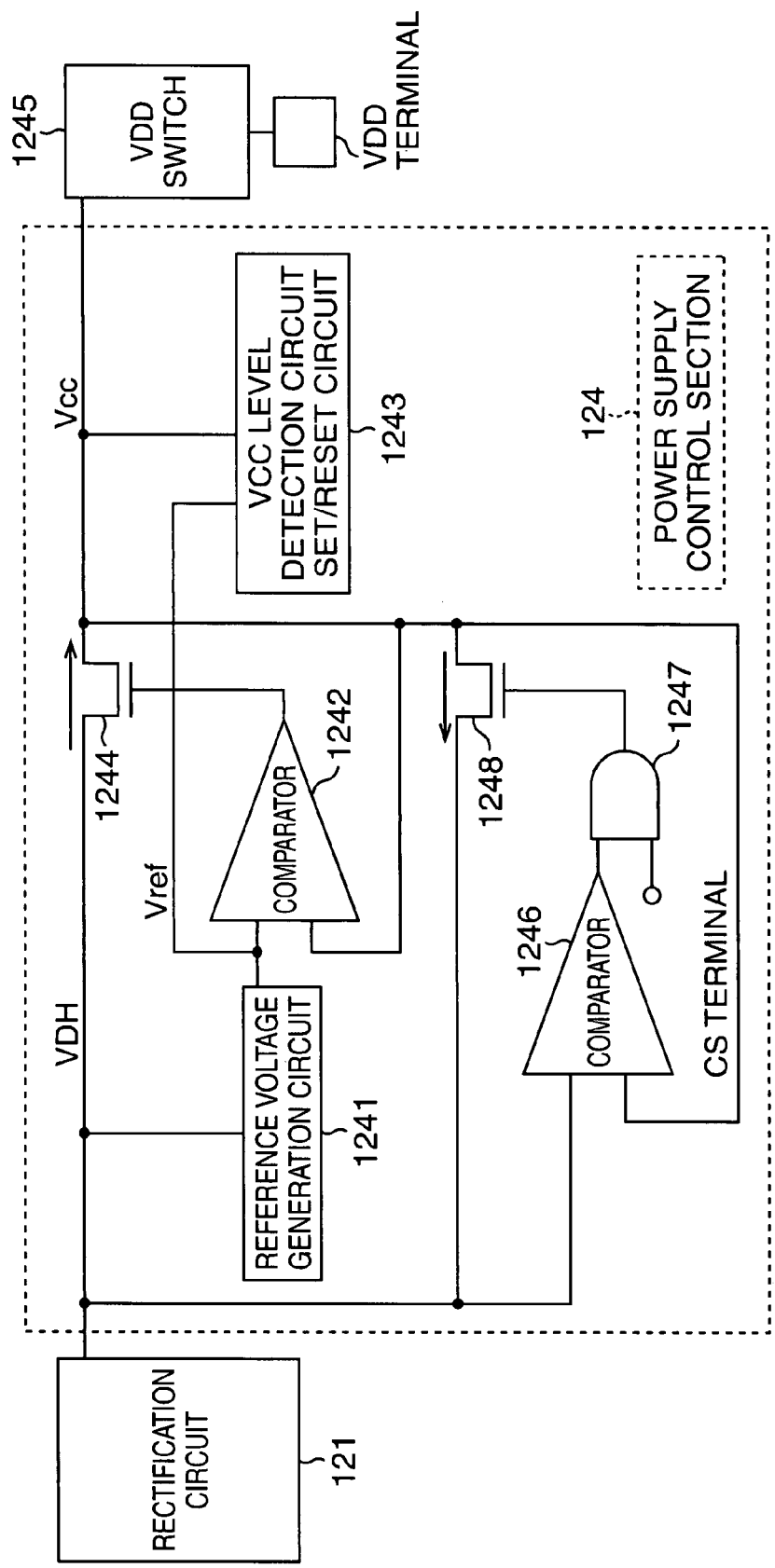
FIG. 10 is a block diagram showing Second Embodiment and illustrating an example of the configuration in the power supply control section of an RF analog section.
Figure 11:
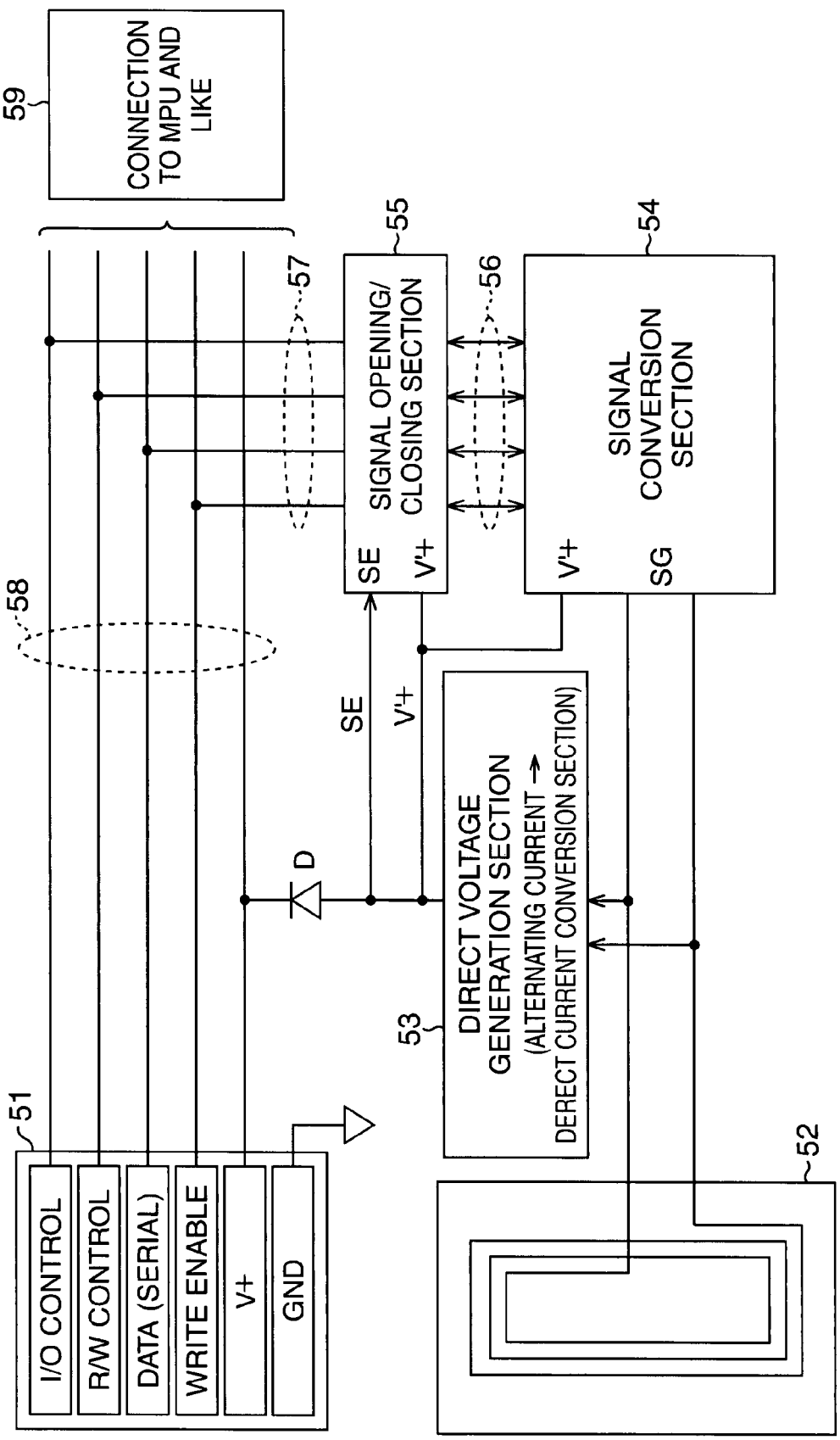
FIG. 11 is a block diagram showing a configuration example of a complex data carrier.

Accordingly, in this embodiment, internal power supply Vcc is provided instead of VDD voltage via a VDD switch 1245 (the switching circuit 211 shown in FIG. 2) as shown in FIG. 10, in comparison with the circuit shown in FIG. 12. Furthermore, a second comparator 1246, an AND circuit 1247, and a second transistor circuit for switch 1248 are added to the circuit in FIG. 12.

The internal power supply terminal Vcc is supplied to the drain electrode of each of the transistor circuit for switch 1244 and the second transistor circuit for switch 1248, one input terminal of each of the comparator 1242 and the second comparator 1246, and the reference voltage generation circuit 1241.

To the other input terminal of the second comparator 1246, rectified voltage VDH is applied. Output from the second comparator 1246 is supplied to one input terminal of the AND circuit 1247. The other input terminal of this AND circuit 1247 is connected to the first contact terminal CS.

According to this configuration, the second transistor circuit for switch 1248 performs an on-operation at the time of the contact operation, and internal power supply Vcc is supplied to the reference voltage generation circuit 1241. Thereby, operating voltage can be supplied to the reference voltage generation circuit 1241 both at the time of the non-contact operation and at the time of the contact operation, it is sufficient to have one reference voltage generation circuit. Therefore, an effect of reducing the circuit area can be obtained.

The situation at the time of the non-contact operation is the same as the case described with reference to FIG. 12. If VDH≦Vcc is satisfied at the time of the contact operation (the first contact terminal CS=high level), voltage is supplied in the direction of Vcc→VDH. If VDH≧Vcc is satisfied, voltage is not supplied in the direction of Vcc→VDH. Therefore, VDH=Vcc is almost kept at the time of the contact operation. Thereby, the reference voltage generation circuit 1241 can operate both at the time of the non-contact operation and at the time of the contact operation.

As described above, in this embodiment, since an operating voltage supply circuit constituted by the second comparator 1246, the AND circuit 1247 and the second transistor circuit for switch 1248 is provided, it is possible to supply operating voltage to the reference voltage generation circuit 1241 both at the time of the non-contact operation and at the time of the contact operation.

According to the present invention, it is possible to provide a data carrier capable of performing both RF communication and contact serial communication with the use of four terminals as contact communication terminals, and thereby, it is possible not only to reduce the manufacture cost of the data carrier capable of performing both RF communication and contact serial communication but also to simplify maintenance management. Furthermore, it is also possible to reduce troubles such as contact failure in proportion to the reduction of the number of terminals.

What is claimed is:

1. A data carrier comprising:
   communication protocol storage means for storing a communication protocol for performing communication with an external communication apparatus;
   a coil terminal section provided with two coil terminals for performing communication with the external communication apparatus with an RF signal;
   a contact communication terminal section provided with a first communication terminal, a second communication terminal, a power supply voltage terminal and a ground terminal as contact communication terminals for performing contact communication with the external communication apparatus; and
   connection control means for causing the power supply voltage terminal and a power supply of an internal switch circuit to be in contact or non-contact with each other depending on a level of voltage applied to the first and second communication terminals.

2. The data carrier according to claim 1, comprising:
   command control means for controlling a command used in an RF communication protocol performed via the coil terminal section or a contact serial communication protocol performed via the contact communication terminal section;
   connection selection means for selectively connecting any one of the coil terminal section and the contact communication terminal section to the command control means;
   command holding means for holding at least an authentication command for performing authentication with the external communication apparatus, a proximity communication command for performing proximity communication with the external communication apparatus, and a vicinity communication command for performing vicinity communication with the external communication apparatus;
   authentication command analysis means for analyzing the level of authentication to be performed with the external communication apparatus, from an inquiry signal received via the coil terminal section;
   authentication command selection means for selecting an authentication command to be used in authentication processing performed with the external communication apparatus, on the basis of the result of the analysis by the authentication command analysis means; and authentication command reading means for reading the authentication command selected by the authentication command selection means, from the command holding means; wherein the command control means performs communication with the use of the communication protocol stored in the communication protocol storage means no matter which of the coil terminal section and the contact communication terminal section is selected.

3. The data carrier according to claim 1, wherein the communication terminals provided for the contact communication terminal section are a serial clock input terminal and a serial data input/output terminal.

4. The data carrier according to claim 2, wherein the authentication commands held by the command holding means are a command to be used in "without authentication" communication, a command to be used in "tag authentication" communication, and a command to be used in "mutual authentication" communication.

5. The data carrier according to claim 2, wherein the authentication command analysis means analyzes whether a command is the proximity communication command or the vicinity communication command on the basis of the subcarrier frequency, communication speed or load modulation intensity of the signal received by the coil terminal section.

6. The data carrier according to claim 1, further comprising an operating voltage supply circuit supplying operating voltage supplied from external equipment when the contact serial communication is performed, to a reference voltage generation circuit provided for a power supply control section constituting an RF analog section generating operating power used when communication is performed with an external communication apparatus with an RF signal.

7. A data carrier system comprising a data carrier and an external communication apparatus communicating with the data carrier, wherein said data carrier includes:

communication protocol storage means for storing a communication protocol for performing communication with an external communication apparatus;

a coil terminal section provided with two coil terminals for performing communication with the external communication apparatus with an RF signal;

a contact communication terminal section provided with a first communication terminal, a second communication terminal, a power supply voltage terminal and a ground terminal as contact communication terminals for performing contact communication with the external communication apparatus; and connection control means for causing the power supply voltage terminal and a power supply of an internal switch circuit to be in contact or non-contact with each other depending on the level of voltage applied to the first and second communication terminals.

8. The data carrier system according to claim 7, comprising:

command control means for controlling a command used in an RF communication protocol performed via the coil terminal section or a contact serial communication protocol performed via the contact communication terminal section;

connection selection means for selectively connecting any one of the coil terminal section and the contact communication terminal section to the command control means;

command holding means for holding at least an authentication command for performing authentication with the external communication apparatus, a proximity communication command for performing proximity communication with the external communication apparatus, and a vicinity communication command for performing vicinity communication with the external communication apparatus;

authentication command analysis means for analyzing the level of authentication to be performed with the external communication apparatus, from an inquiry signal received via the coil terminal section;

authentication command selection means for selecting an authentication command to be used in authentication processing performed with the external communication apparatus, on the basis of the result of the analysis by the authentication command analysis means; and authentication command reading means for reading the authentication command selected by the authentication command selection means, from the command holding means; wherein the command control means performs communication with the use of the communication protocol stored in the communication protocol storage means no matter which of the coil terminal section and the contact communication terminal section is selected.

9. The data carrier system according to claim 7, wherein the communication terminals provided for the contact communication terminal section are a serial clock input terminal and a serial data input/output terminal.

10. The data carrier system according to claim 8, wherein the authentication commands held by the command holding means are a command to be used in "without authentication" communication, a command to be used in "tag authentication" communication, and a command to be used in "mutual authentication" communication.

11. The data carrier system according to claim 8, wherein the authentication command analysis means analyzes whether a command is the proximity communication command or the vicinity communication command on the basis of the subcarrier frequency, communication speed or load modulation intensity of the signal received by the coil terminal section.

12. The data carrier system according to claim 7, further comprising an operating voltage supply circuit supplying operating voltage supplied from external equipment when the contact serial communication is performed, to a reference voltage generation circuit provided for a power supply control section constituting an RF analog section generating operating power used when communication is performed with an external communication apparatus with an RF signal.

* * * * *